(12) United States Patent
Pekurovsky et al.

(10) Patent No.: US 7,685,693 B2
(45) Date of Patent: Mar. 30, 2010

(54) METHOD OF FORMING COATING DIE WITH EXPANSIBLE CHAMBER DEVICE

(75) Inventors: Mikhail L. Pekurovsky, Bloomington, MN (US); Joan M. Noyola, Maplewood, MN (US); Scott L. Ciliske, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 11/923,792

(22) Filed: Oct. 25, 2007

(65) Prior Publication Data

US 2008/0040908 A1 Feb. 21, 2008

Related U.S. Application Data

(62) Division of application No. 10/278,555, filed on Oct. 23, 2002, now Pat. No. 7,344,665.

(51) Int. Cl.
*B23P 19/04* (2006.01)
*B29C 47/92* (2006.01)

(52) U.S. Cl. .................................. 29/454; 260/40.7

(58) Field of Classification Search .............. 29/454, 29/428, 460, 469; 264/40.7, 212; 427/356; 118/410, 669, 679, 419; 425/380, 382.4, 425/375; 222/386.5, 399, 355, 394
See application file for complete search history.

(56) References Cited

U.S. PATENT DOCUMENTS

| 1,939,611 | A | 12/1933 | Purvis |
| 3,595,204 | A | 7/1971 | McIntyre et al. |
| 3,649,147 | A | 3/1972 | Fritsch |
| 3,973,961 | A | 8/1976 | Stroszynski |
| 4,050,410 | A | 9/1977 | Stroszynski |
| 4,324,816 | A | 4/1982 | Landis et al. |
| 4,622,239 | A | 11/1986 | Schoenthaler et al. |
| 4,729,858 | A | 3/1988 | Chino et al. |
| 4,831,961 | A | 5/1989 | Chino et al. |
| 4,938,994 | A | 7/1990 | Choinski |
| 5,000,988 | A | 3/1991 | Inoue et al. |
| 5,096,092 | A | 3/1992 | Devine |
| 5,183,508 | A | 2/1993 | Cholinski |
| 5,360,629 | A | 11/1994 | Milbourn et al. |

(Continued)

FOREIGN PATENT DOCUMENTS

EP 1 197 267 A1 4/2002

(Continued)

*Primary Examiner*—John C Hong
(74) *Attorney, Agent, or Firm*—James A. Baker

(57) ABSTRACT

The disclosure relates to a method for forming a die having an applicator slot for translating an applicator liquid through the die. The slot is in fluid communication with a die cavity. An expansible chamber device is disposed within the die cavity and changes volume in response to changes in fluid pressure within the expansible chamber device, which may be regulated by a means for controlling the volume of the expansible chamber device. In some embodiments, the die has a single rectangular applicator slot, and the expansible chamber device is an expandable cylindrical tube disposed within the die cavity. In other embodiments, the fluid within the expansible chamber device may be selected to be a compressible gas. In further embodiments, the fluid within the expansible chamber device may be selected to be an incompressible liquid.

15 Claims, 5 Drawing Sheets

U.S. PATENT DOCUMENTS

| | | |
|---|---|---|
| 5,626,673 A | 5/1997 | Leeds et al. |
| 5,881,914 A | 3/1999 | Tsuda et al. |
| 5,989,622 A | 11/1999 | Iwashita et al. |
| 6,302,306 B1 | 10/2001 | Lin et al. |
| 6,361,606 B1 | 3/2002 | Jairazbhoy |
| 6,455,105 B1 | 9/2002 | Sakai et al. |
| 6,699,326 B2 | 3/2004 | Suszynski |
| 2002/0017238 A1 | 2/2002 | Shinozaki et al. |

FOREIGN PATENT DOCUMENTS

| | | |
|---|---|---|
| JP | 6-226180 | 8/1994 |
| JP | 10-66923 | 3/1998 |
| JP | 2000-189875 | 7/2000 |
| JP | 2001-62368 | 3/2001 |

METHOD OF FORMING COATING DIE WITH EXPANSIBLE CHAMBER DEVICE

CROSS REFERENCE TO RELATED APPLICATIONS

This application is a divisional of U.S. application Ser. No. 10/278,555, filed Oct. 23, 2002, now U.S. Pat No 7,344,665, the disclosure of which is incorporated by reference in its entirety herein.

BACKGROUND

The invention relates generally to coating and extruding apparatus. More particularly, the present invention relates to coating and extruding apparatus that can be used to vary the transition rate of a fluid out of a die.

Using extrusion dies to form films and coating dies to coat a fluid onto a substrate is known. It is also known to coat a fluid onto a web in a series of discrete patches, or to extrude a film intermittently (e.g. onto a chilled roll). For example, one known way to coat intermittently onto a substrate is to use a flexographic coating process. Flexographic coating processes use rolls having raised surfaces that are pressed against a substrate. Each raised surface on the roll transfers a "patch" of coating fluid to the substrate. Using the flexographic coating process has many limitations. For example, in order to apply more than one type of fluid (e.g., different colors) to specific areas on a moving web requires a series of coating stations (typically requiring large rolls) with drying ovens positioned after each coating station. The fluids are typically applied by a coat/dry, coat/dry, ..., coat/dry process. Thus, in order to coat multiple fluids multiple pieces of large expensive equipment must be used. Additionally, the repeat pattern on the roll determines the location of each patch of fluid and the spacing of the patches cannot be varied without changing the pattern of the raised surfaces or removing or replacing the rolls themselves. Thus, the overall repeat length of a patch series is limited and set by the circumference of the flexographic cylinders. Patch sizes cannot be changed except by changing the cylinders.

It is also known to provide a coating apparatus that has a main pump that provides the major supply of fluid to a coating die. Dosing pumps have been used to add and retract fluid in the die for starts and stops, respectively, of the coating process. In other words, the main pump provides a continuous supply of fluid to maintain a coating process and the dosing pump acts concurrently, adding or subtracting fluid to the die.

It is known to provide an apparatus for coating a pattern of spaced discrete patches on the web of material by using a metering pump that supplies coating fluid to the internal cavity of an extrusion (or coating) die from a fluid reservoir. The dies may also include a piston alone or in combination with a pump that can be translated into or out of the cavity to control the flow of fluid out of the extrusion/coating die. Typically, by translating the piston into the cavity of the die, material is translated out of the die (e.g., onto a substrate). Translating the piston out of the cavity typically stops translation of the fluid out of the die. One example of this concept are ram dies wherein the driving force for expelling the material from the die is provided directly by a long, thin piston positioned along the internal cavity of the die and along its width. These types of coating apparatus may also utilize a diaphragm, clamped so as to change the volume within a draw-in chamber when directly attached to a piston. The apparatus described above present the difficulty of providing for smooth motion of the piston or ram without contamination of the material being coated or extruded.

BRIEF SUMMARY OF THE INVENTION

The invention includes an apparatus comprising a die having at least one application slot. The slot is in fluid communication with a die cavity. An expansible chamber device is disposed within the die cavity and changes volume in response to changes in pressure within the expansible chamber device.

Another aspect of the invention is a method of translating liquid through a die. A coating die is provided. The die comprises at least one applicator slot in fluid communication with a die cavity. An expansible chamber device is disposed within the cavity. The expansible chamber device is actuated by changing the fluid pressure within the expansible chamber device. Liquid is delivered from the application slot at a variable rate influenced by the actuation of the expansible chamber device.

Another aspect of the invention is a method for forming a die. An apparatus comprising a die having at least one applicator slot in fluid communication with the die cavity is provided. An expansible chamber device is disposed within the die cavity.

BRIEF DESCRIPTION OF THE DRAWING

The present invention will be further explained with reference to the drawing figures referenced below, wherein like structure is referred to by like numerals throughout the several views.

Patents, patent applications, and publications disclosed herein are hereby incorporated by reference (in their entirety) as if individually incorporated. It is to be understood that the above description is intended to be illustrative, and not restrictive. Various modifications and alterations of this invention will become apparent to those skilled in the art from the foregoing description without departing from the scope of this invention, and it should be understood that this invention is not to be unduly limited to the illustrative embodiment set forth herein.

DETAILED DESCRIPTION OF ILLUSTRATIVE EMBODIMENTS OF THE INVENTION

Figure 1:
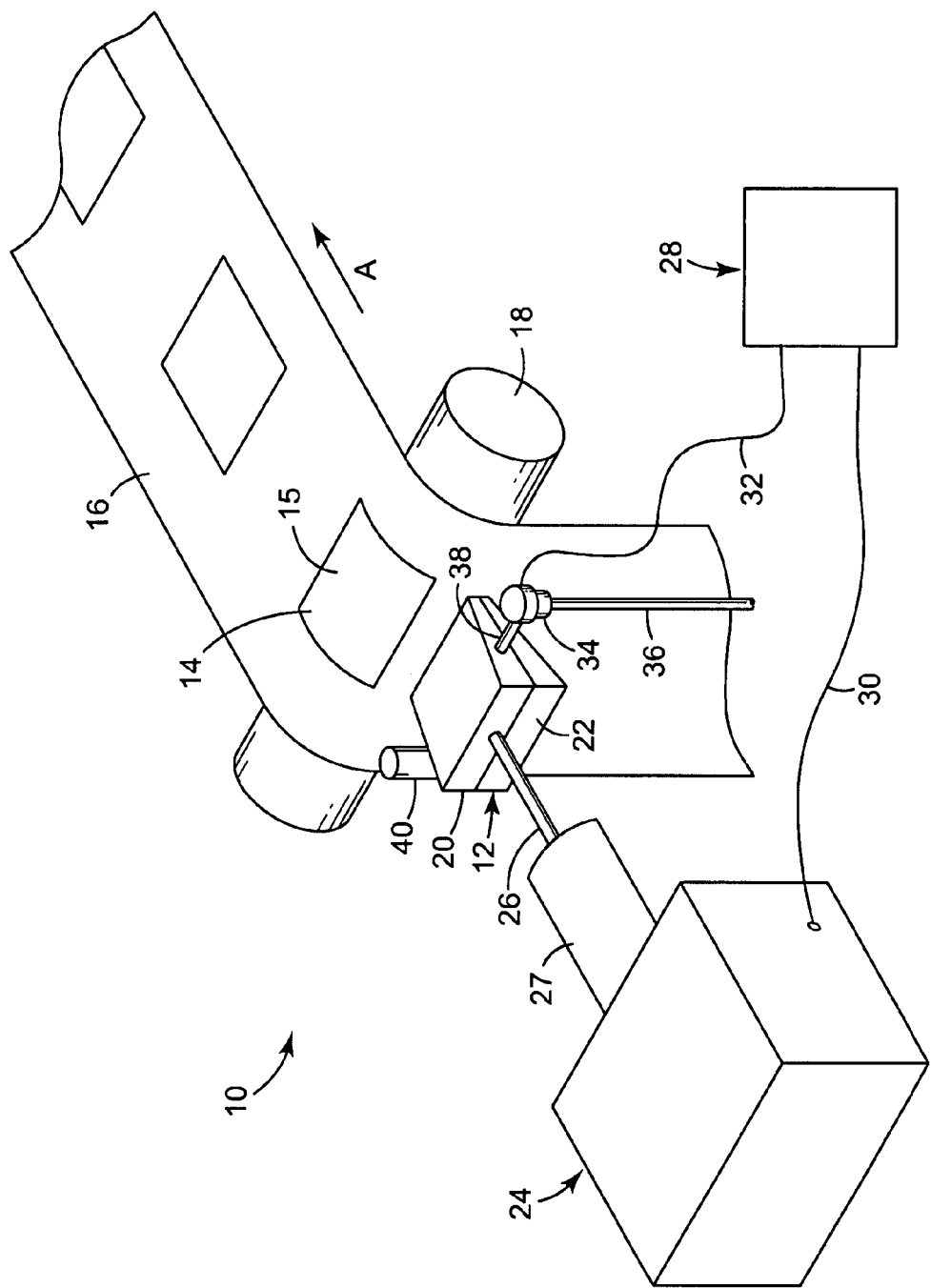
FIG. 1 is a perspective view of a portion of a coating line including a coating die according to the present invention.

Referring now to FIG. 1, a perspective view of a portion of a coating line 10 including a coating die 12 according to the present invention is illustrated. The die 12 is depicted applying discrete patches 14 of a fluid material 15 to a web 16 moving in direction "A" away from roller 18. It should be noted that while a coating process is illustrated in FIG. 1, this is shown for exemplary purposes only. The invention can be used in other coating or extruding applications without departing from the spirit and scope of the invention. For example, inventive die 12 could be used to extrude fluid onto a chilled roll, among other applications. The die 12 conveniently includes a first portion 20 and a second portion 22. Although a two-portion die 12 has been described and illustrated, the ordinary artisan will know that it is sometimes more convenient to provide the die as a single piece or as a multiple piece construction. In the depicted embodiment, an extruder 24 supplies the material to be applied to web 16 into the die 12 through a material supply port 26. Other methods for providing continuous or intermittent flow into a die are known to a person of ordinary skill in the art, and are considered to be within the scope of the invention. For example, some preferred embodiments, a positive displacement pump 27 is used to meter flow into the material supply port 26, so as to control more accurately the starting and stopping of material flow, and to prevent reverse flow back towards the extruder 24.

As will be discussed with more particularity in connection with FIGS. 2 and 3 below, the present invention can coordinate delivery the of fluid material 15 to the die 12 and the control of the volume of the expansible chamber device 42 (illustrated in FIG. 2) within the die 12. The control of the volume within the expansible chamber device 42 is generally accomplished by varying the fluid pressure within the expansible chamber device 42. For example, the volume of a fluid within the expansible chamber device 42 may be measured and varied (thus varying the fluid pressure) to control the volume of the expansible chamber device 42, or the pressure of the fluid within the expansible chamber device 42 may be directly measured and varied to control the volume of the expansible chamber device 42. With such coordination, very fine control of the timing of the translation of fluid material 15 from the die 12 can be achieved. The embodiment illustrated in FIG. 1 provides this coordination utilizing a process controller 28, (e.g., a programmable logic controller) in communication with the extruder 24 via control line 30. The process controller 28 gives commands to intermittently start and stop the delivery of fluid material 15 to the die 12, and thus provides one control over the placement of patches 14 on the web 16. Additionally, the positive displacement pump 27 can be controlled by the process controller 28 as well. While this illustration depicts discrete patches on a moving web, the invention may also be used to create regions of varying coating thickness, rather than regions where the coating is not applied at all. Further, the application of coating liquid to discrete articles, rather than only a continuous, indefinite length web is also contemplated.

In the embodiment illustrated, the process controller 28 communicates via control line 32 with control device 34, giving commands for the regulation of pressure within the expansible chamber device 42 (illustrated in FIG. 2) via fluid port 38. For example, fluid pressure inside the expansible chamber device 42 can be increased or decreased by increasing or decreasing the volume of fluid inside expansible chamber device 42. Alternatively, fluid pressure inside the expansible chamber device 42 can be increased or decreased by inserting a mechanical plunger inside the expansible chamber device 42, displacing existing fluid within the expansible chamber device 42.

A bleed valve train 40 may also be connected to die 12 to remove air from the hydraulic system. Again, it should be noted that the process devices described (e.g., process controller control device 34, and bleed valve train 40) are described and shown for exemplary purposes only. Other embodiments for controlling and configuring the die may be used without departing from the spirit and scope of the invention.

Figure 2:
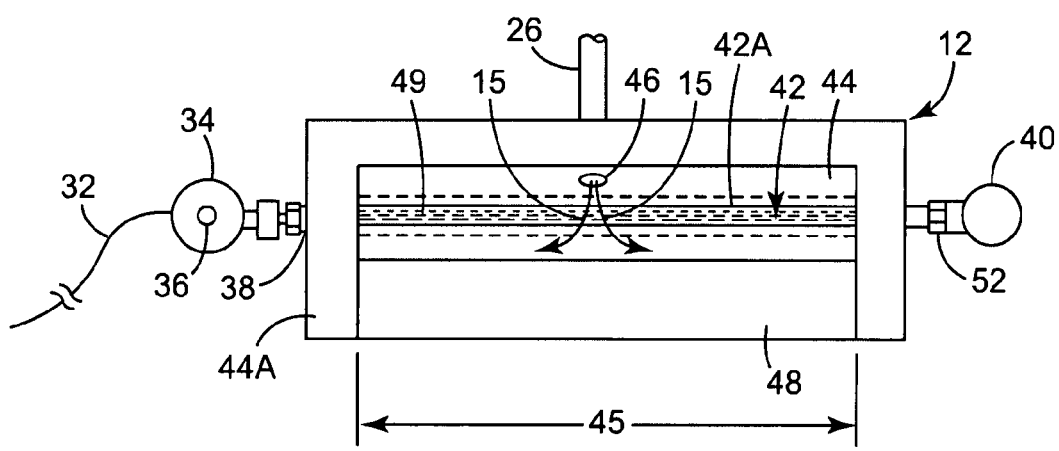
FIG. 2 is a bottom view of the inventive coating die and some of its supporting equipment, shown with some of the die partially removed so that the expansible chamber device can be visualized.

FIG. 2 illustrates a bottom view of the die 12 and some of its supporting equipment with the second portion 22 (shown in FIGS. 1 and 3) removed from the die 12. One embodiment of expansible chamber device is illustrated at 42. First portion 20 can now be seen to partially define a die cavity 44. In the illustrated embodiment, the die cavity 44 is also defined by the second portion 22 that has been removed from this figure, however any die configuration which defines a cavity is within the scope of the invention. It will be noted that in the depicted embodiment, the expansible chamber device 42 extends across an entire width 45 of die cavity 44, and this is convenient for many of the most useful applications of the present invention. However, other end use applications may configure the expansible chamber device 42 such that it extends only through one or more portions of the width of die cavity 44. Also considered within the scope of the invention are embodiments where the expansible chamber device 42 is defined in part by the surface of the die cavity 44, e.g. an elastomeric bladder making an edge seal with the typically metal walls of the first portion 20 or the second portion 22.

The expansible chamber device 42 is in fluid communication with fluid pressure line 36 through fluid port 38. As discussed previously, varying the pressure of fluid medium 49 within expansible chamber device 42 changes the volume of the device 42. In other words, the fluid medium 49 engages (or is "coupled") to the wall (or walls) 42A of the expansible chamber device 42 such that a change in the amount of fluid pressure (e.g. due to a change in volume of the fluid medium 49 or due to a displacement of the fluid medium 49) expressed against the walls of the expansible chamber device 42 will cause the wall 42A to move proportionately to this change in pressure. This assumes that pressure changes on the other side of the wall 42A remain small relative to the changes in pressure within the expansible chamber device 42. Utilizing fluid medium 49 to transfer force to wall 42A of the expansible chamber device 42 (versus, for example, a mechanical connection) provides translation of force substantially equally across all areas of the wall 42A engaged by fluid medium 49 since force is translated throughout the fluid and to any portion of wall 42A couple or engaged by the fluid medium 49. This transfer of force occurs at a very high rate.

In one embodiment, the expansible chamber device 42 is comprised of a polymeric tube (as illustrated), but any suitable physical shape is contemplated to be within the scope of the invention. One advantage of the invention, which particularly accrues to embodiments where the expansible chamber device 42 is a polymeric tube, is that it is particularly easy to retrofit onto existing production dies, since it can be installed by drilling a hole into the die cavity 44 through the wall 44A of the die 12 and inserting the device 42. Additionally, utilizing cylindrical geometry (e.g., a tubular shape) for the expansible chamber device 42 allows the change in volume per unit length of the expansible chamber device 42 in response to a change in the fluid pressure within itself to be substantially equal across the entire width of the die cavity. This allows the die 12 to be designed such that actuating the expansible device 42 translates fluid material 15 uniformly out of die 12 along longitudinal dimension 45. It is also contemplated that thin wall metal tubes or bellows could be used, increasing the responsiveness of the tube in changing diameter thereby providing a high level of dynamic performance to the die 12. The configuration of the inventive apparatus also provides for minimal moving parts inside the die. The inventive apparatus allows for the translation of fluid material 15 out of the die 12 with minimal (if any) lubrication required for the expansible chamber device 42.

Material supply port 26 has an outlet 46 in communication with die cavity 44 so that the fluid material 15 to be coated may enter the die cavity 44. The die cavity 44 communicates with slot region 48. As illustrated in FIG. 3, slot region 48 of first die portion 20 combines with second portion 22 to define an applicator slot 50. In one embodiment, slot region 48 extends the entire width 45 of die cavity 44. In other embodiments, slot region 48 may extend only along a portion of the width 45 of die cavity 44.

It can also be appreciated that bleed valve train 40 is also in fluid communication with the expansible chamber device 42 via conduit 52. The bleed valve train 40 is optional, and not needed in all coating systems constructed according to the present invention. However, in hydraulic systems it is sometimes useful to include a mechanism to purge unwanted gas from the hydraulic lines in order to sharpen the system response. Suitable elements are further illustrated in FIG. 4.

As discussed above, control over the extruder 24 and positive displacement pump 27 typically provide primary control over the translation of the fluid material 15 out of die 12, through slot region 48. However, due to many reasons such as the mass of the extruder's mechanism, and the mass and viscosity of the material to be translated (i.e., extruded or coated) using only pump 27 and/or extruder 24 does not to control the starting and stopping of material flow with the degree of precision required. In the present invention, the expansible chamber device 42 can be used to precisely control the starting, stopping and speed of the translation of fluid material 15 through slot region 48 by precisely adjusting the volume of die cavity 44. In the illustrated embodiment it will be appreciated how a sudden pressure rise within the expansible chamber device 42 will expand the diameter of the expansible chamber device 42 (illustrated by dotted lines) which causes expansible chamber device 42 to occupy more volumetric area within die cavity 44, displacing fluid material 15 within die cavity 44. Thus, expansible chamber device 42 can initiate the delivery of fluid material 15 through slot region 48. In one application, this "actuation" of the expansible chamber device 42 can begin the laying down of a patch of material on a substrate. Due to the placement of the expansible chamber device 45 of the cavity 44 there is a constant change in volume of the die cavity 44 across the width 45 of the die cavity 44 and fluid material is translated evenly out of the slot region 48 across the entire width of the die. At the trailing edge of the patch, a sudden pressure drop within the expansible chamber device 42, and the consequent volume decrease of the expansible chamber device 42 (shown by dotted lines), causes the material to "snuff back", and does it evenly across the entire width of the slot region 48. It will be further appreciated, that in some applications (e.g., particularly when the die size is small and when the coating fluid has low viscosity) that the expansible chamber device 42 could provide primary control over the translation of fluid material from the die 12 (i.e., without utilizing pump 27 and/or extruder 24).

Figure 3:
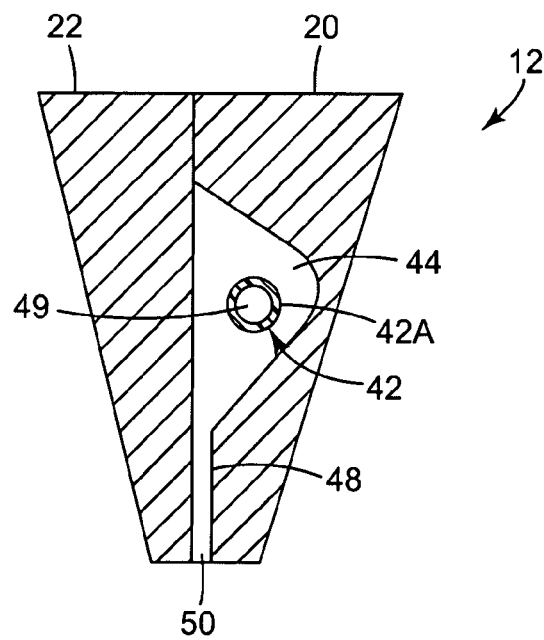
FIG. 3 is a cross-section end view of the die of FIG. 2.

Referring to FIG. 3 (a cross-section end view of the coating die 12 of FIG. 2), first portion 20 is seen attached to second portion 22, and it can be more readily appreciated how the two die portions define the die cavity 44 and the applicator slot 50 having a length extending generally along the width of the cavity 44. In one contemplated embodiment, the fluid medium 49 used to change the volume of the expansible chamber device 42 is air, while another embodiments the fluid medium 49 is a liquid such as water or oil. The use of an incompressible fluid as the fluid medium 49 (e.g. water or oil) provides additional inventive advantages, especially when using a volume displacement device to serve as the control mechanism 34. When incompressible fluid is used as the fluid medium 49, the volume of fluid medium 49 added or subtracted from the expansible chamber device 42 can be used to calculate the displacement of the expansible chamber device 42, and thus the volume of fluid material 15 displaced in the die cavity 44. This is due to the fact that the change in volume of the expansible chamber device 42 is related linearly to the amount of fluid medium 49 added or subtracted to the expansible chamber device 42.

The expansible chamber device 42 may be fabricated from silicone, urethane, or fluoroelastomers such as Fluorel™ or Viton™ or any other material compatible with the fluid within the expansible chamber device, the fluid to be coated, and the temperature at which the coating occurs.

Figure 4:
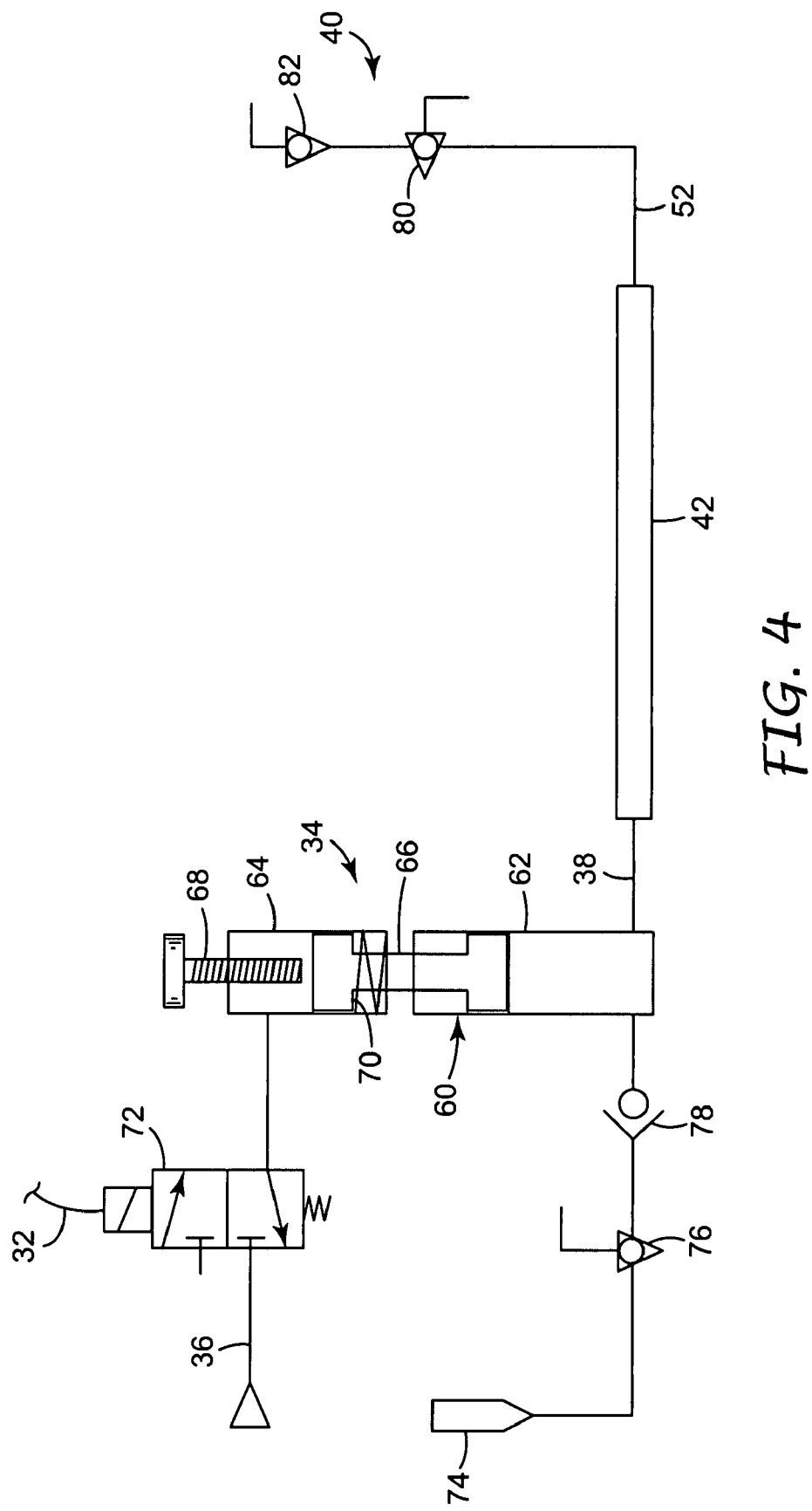
FIG. 4 is a schematic view of one embodiment of a control mechanism suitable for use with the present invention.

A schematic view of one embodiment of a control mechanism 34, which varies the volume of the fluid material 49 within the expansible chamber device 42, is illustrated in FIG. 4. A hybrid pneumatic/hydraulic system is illustrated, with hydraulic fluid being the working fluid to control the volume of the expansible chamber device 42. With the working fluid being virtually incompressible, it is convenient to use a volume displacement device 60. The positive displacement device 60 includes hydraulic cylinder 62 and pneumatic cylinder 64 connected by a common rod 66. Pneumatic cylinder 64 immediately includes a stroke limiter 68 and a spring bias 70 urging rod 66 towards the stroke limiter. An apparatus of this type is commercially available as model number P250 V225 BTG available from Williams Instrument Company of Ivyland, Pa. Pneumatic cylinder 64 is conveniently controlled by a solenoid valve 72 that reacts to control signals along control line 32.

In this embodiment hydraulic fluid is conveniently provided into the system from a reservoir 74. An overflow valve 76 and a check valve 78 conduct fluid from the reservoir 74 towards hydraulic cylinder 62. In the depicted embodiment bleed valve train 40 includes overflow valve 80 and bleed valve 82. In this embodiment the volume of fluid medium 49 displaced in the volume displacement device 60 can be monitored to control the change in volume of the expansible chamber device 42. The change in volume of fluid medium 49 within expansible chamber device 42 changes the fluid pressure within expansible chamber device 42, altering the volume of the expansible chamber device 42. It should be understood that the control mechanism 34 described and illustrated with respect to FIG. 7 is one exemplary embodiment that may be used in the current invention. Other control mechanisms 34 may be utilized without departing from the spirit and scope of the invention.

Figure 5:
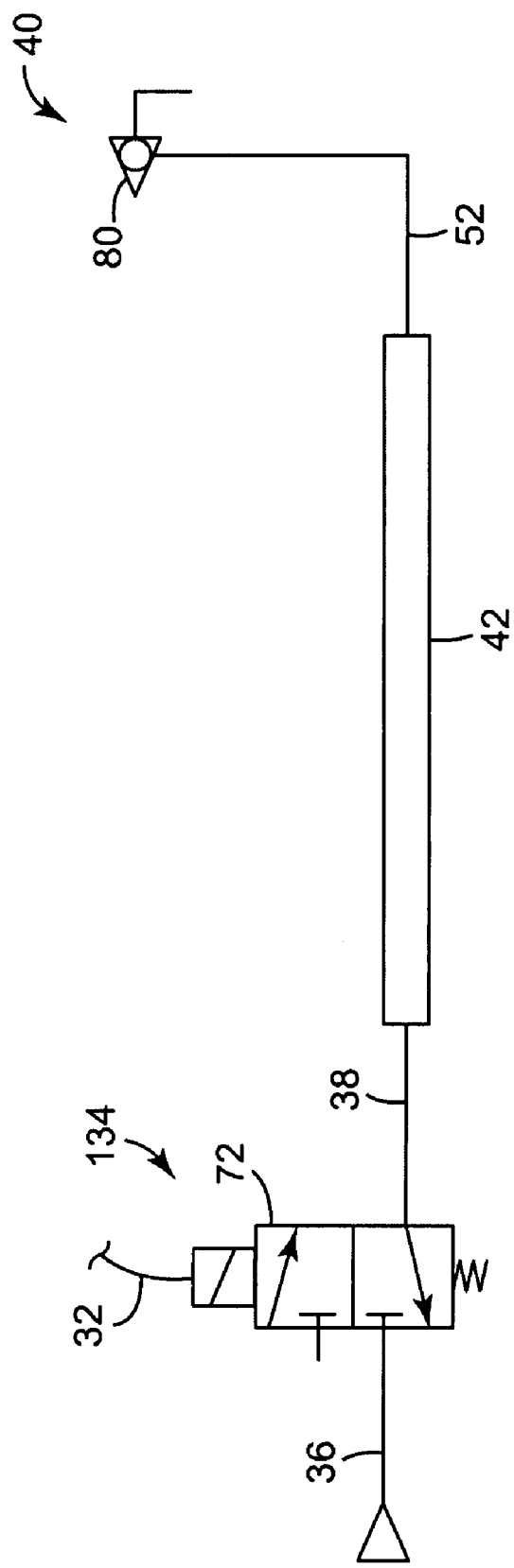
FIG. 5 is a schematic view of a second embodiment of a control mechanism suitable for use with the present invention.

A schematic view of a second embodiment of a control mechanism 134 is shown in FIG. 5. In this embodiment, a pneumatic system is illustrated using solenoid valve 72 placed directly in series with expansible chamber device 42. In this embodiment air pressure (or other compressible fluid) is provided from fluid pressure line 36 source (such as factory air pressure line) and directed through the solenoid valve 72 which adjusts the air pressure directed to the expansible chamber device 42 according to control signals along control line 32. Overpressure valve 80 may also be provided. Thus, in this embodiment fluid pressure within expansible chamber device 42 is monitored to control change in volume of the expansible chamber device 42.

Figure 6:
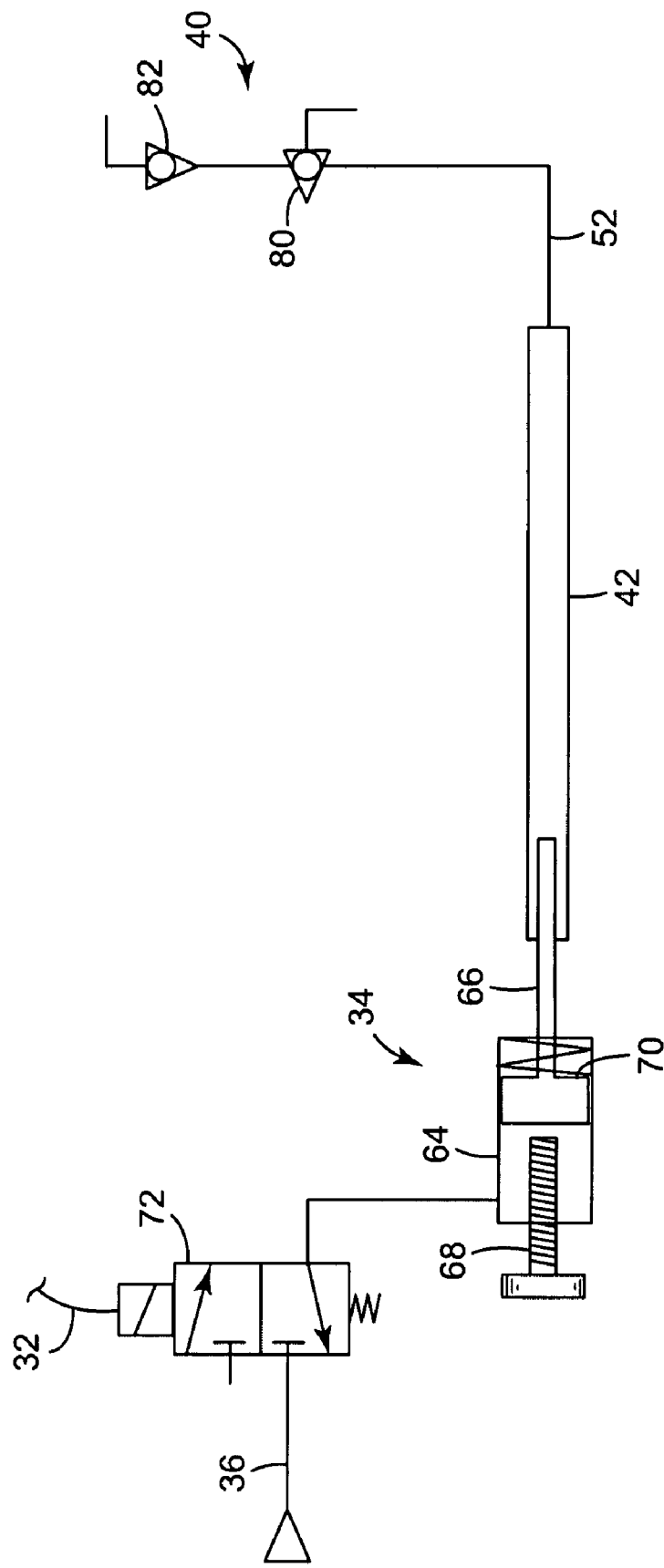
FIG. 6 is a schematic view of a third embodiment of a control mechanism suitable for use with the present invention.

A schematic view of a third embodiment of a control mechanism 234 is illustrated in FIG. 6 using substantially the same components as those illustrated in FIG. 4 with the exception that rod 66 extends directly into expansible chamber device 42. Extending rod 66 into expansible chamber device 42 allows rod 66 to displace fluid medium 49 within expansible chamber device 42 without adding or subtracting fluid from expansible chamber device 42. Changing the displacement of fluid medium 49 within expansible chamber device 42 changes the fluid pressure within the expansible chamber device 42, changing the volume of the expansible chamber device 42.

The present invention addresses the disadvantages inherent in the devices described above by provides a die for coating or extrusion having a die cavity and adjacent to an applicator slot, and an expansible chamber device disposed within the cavity. The expansible chamber device responds with a change in its volume to a change in the fluid pressure within itself, and preferably the expansible chamber device extends across substantially the entire width of the die cavity. In preferred embodiments, the change in volume per unit length of the expansible chamber device responding to a change in the fluid pressure within itself is substantially equal across the entire width of the die cavity. Conveniently, in one of the embodiments of the present invention the apparatus is connected to a pressure control mechanism in fluid communication with the expansible chamber device and adapted to control the fluid pressure within the expansible chamber device.

Although the present invention has been described with reference to preferred embodiments, workers skilled in the art will recognize that changes may be made in form and detail without departing from the spirit and scope of the invention.

The invention claimed is:

1. A method of forming a die assembly, comprising the steps of:
   forming a die cavity in fluid communication with a single applicator slot, wherein the die cavity exhibits a length, a width and a volume, further wherein the single applicator slot extends transversely across substantially the entire width of the die cavity;
   disposing an expansible chamber device within the die cavity, wherein the expansible chamber device comprises a substantially cylindrical tube having a major dimension substantially perpendicular to a substantially circular cross-section, wherein the substantially cylindrical tube is disposed within the die cavity with the major dimension extending transversely across substantially the entire width of the die cavity.

2. The method of claim 1 wherein the circular cross-section of the expansible chamber device extends across substantially the length of the die cavity.

3. The method of claim 1 wherein the major dimension of the expansible chamber device is disposed substantially parallel to the applicator slot of the die cavity.

4. The method of claim 1 wherein the expansible chamber device is comprised of a polymer.

5. The method of claim 1 wherein the expansible chamber device is comprised of a metal.

6. The method of claim 1 wherein the single applicator slot is rectangular.

7. The method of claim 6, wherein the substantially cylindrical tube exhibits an initial volume less than the volume of the die cavity, additionally wherein the volume of the expandable cylindrical tube is expandable from the initial volume to an expanded volume less than the volume of the die cavity in response to an increase in pressure of a fluid within the expandable tube, and contractable from the expanded volume in response to a decrease in pressure of the fluid within the expandable cylindrical tube.

8. The method of 7 wherein the substantially cylindrical tube comprises a material selected from the group consisting of silicone, urethane, and fluoroelastomers.

9. The method of claim 1, further comprising placing the expansible chamber device in flow communication with a control means for controlling the volume of the expansible chamber device by increasing and decreasing the volume of the expansible chamber device.

10. The method of claim 9 wherein the control means comprises a pressure control mechanism in flow communication with the expansible chamber device and adapted to control the pressure of a fluid within the expansible chamber device.

11. The method of claim 10 wherein the fluid is selected to be a compressible gas.

12. The method of claim 11, wherein the compressible gas is selected to be air.

13. The method of claim 9 wherein the control means comprises a volume displacement device in flow communication with the expansible chamber device and adapted to control the volume of a fluid within the expansible chamber device.

14. The method of claim 13, wherein the fluid is selected to be an incompressible liquid.

15. The method of claim 14, wherein the incompressible liquid is selected from water and oil.

* * * * *

UNITED STATES PATENT AND TRADEMARK OFFICE
CERTIFICATE OF CORRECTION

| | | |
|---|---|---|
| PATENT NO. | : 7,685,693 B2 | Page 1 of 1 |
| APPLICATION NO. | : 11/923792 | |
| DATED | : March 30, 2010 | |
| INVENTOR(S) | : Mikhail L. Pekurovsky | |

It is certified that error appears in the above-identified patent and that said Letters Patent is hereby corrected as shown below:

Column 8
Line 20, delete "7" and insert --claim 7--

Signed and Sealed this
Nineteenth Day of April, 2011

David J. Kappos
*Director of the United States Patent and Trademark Office*